Fig.1   Fig.2

Inventor:
HENRI CALÈS
By Irwin S. Thompson
ATTY.

Feb. 17, 1970   H. CALES   3,495,667
DRILLING MACHINE
Filed June 29, 1967   12 Sheets-Sheet 2

Inventor:
HENRI CALÈS
By Irwin S. Thompson
ATTY.

Inventor:
HENRI CALÈS

Fig. 10

Feb. 17, 1970          H. CALES          3,495,667

DRILLING MACHINE

Filed June 29, 1967

Inventor:
HENRI CALÈS

Feb. 17, 1970    H. CALES    3,495,667
DRILLING MACHINE
Filed June 29, 1967    12 Sheets-Sheet 12

Inventor:
HENRI CALÈS
By Irwin S. Thompson
ATTY.

3,495,667
DRILLING MACHINE
Henri Cales, Paris, France, assignor to Societe Francaise de Construction de Bennes Automatiques Benoto, Paris, France
Filed June 29, 1967, Ser. No. 649,972
Claims priority, application France June 30, 1966, 67,556; Apr. 11, 1967, 102,201
Int. Cl. E21b 9/00, 19/00
U.S. Cl. 175—161        4 Claims

ABSTRACT OF THE DISCLOSURE

A drilling machine has a side-opening dumping guide which is laterally swingable to one side with the drilling tool so as to dump material upon reverse rotation of the drilling tool. The dumping guide carries a rotary table and a motor for rotating the table. A cylindrical casing that extends underground and through which the drilling tool extends may be raised into nonrotative contact with the dumping guide. The machine provides apparatus by which a wide variety of drilling machines may be converted into a variety of rotary drilling machines.

---

The present invention relates to drilling machines, more particularly of the type in which a suspended tool is lowered into the ground to dig an upright hole in the ground.

It is an object of the present invention to provide a drilling machine which may be readily converted from any of a variety of known drilling machines to any of a variety of rotary drilling machines.

Another object of the present invention is the provision of a drilling machine in which material dug from the ground may be readily dumped.

Still another object of the present invention is the provision of a drilling machine which will be relatively simple and inexpensive to manufacture, easy to assemble, convert, operate, maintain and repair, and rugged and durable in use.

Other objects and advantages of the present invention will become apparent from a consideration of the following description, taken in connection with the accompanying drawings, in which.

Thus, FIGS. 1–10 relate to a first embodiment of the invention, while FIGS. 11–19 relate to a second embodiment of the invention.

Referring now to the drawings in greater detail, and first to the embodiment of FIGS. 1–10, it will be seen that the present invention comprises a generally semi-cylindrical dumping guide 1 provided with lugs 2 and 3 to which are linked connecting rods 4 and 5, the ends of which are articulated at 6 and 7 with a cross member 8 removably secured to the frame of the machine.

Figure 5:
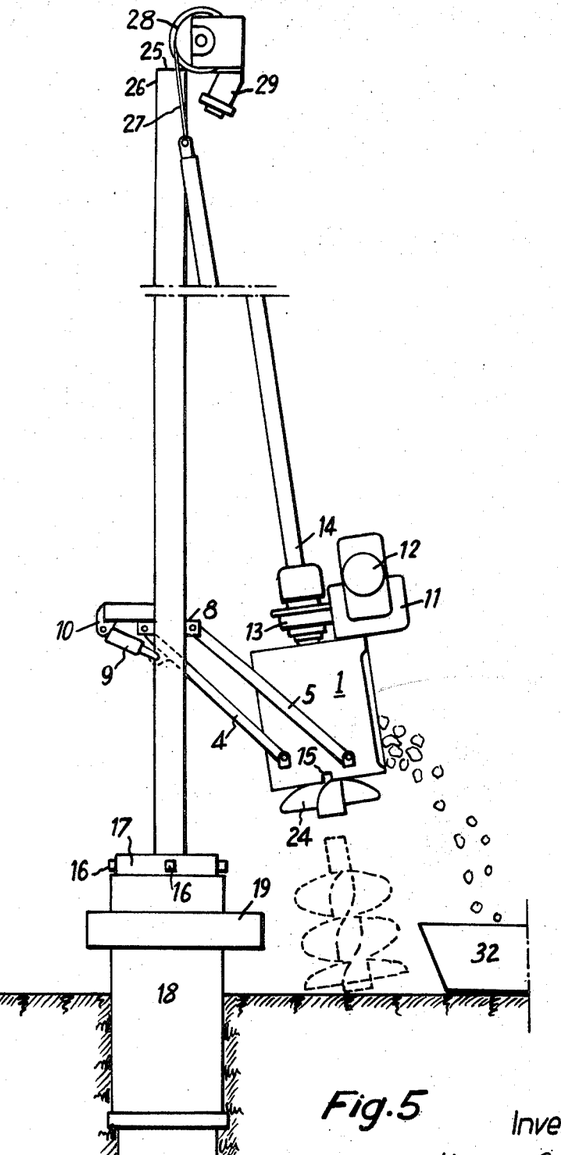
FIGURE 5 is a view similar to FIG. 1, but showing the parts in dumping position, the drilling tool being shown in full line in the position it occupies during this dumping operation and in phantom line in a position it may occupy when detached from the apparatus.
Figure 6:
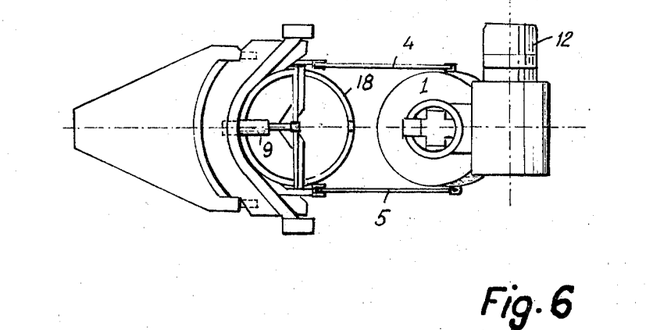
FIGURE 6 is a top plan view of the structure of FIG. 5.

These connecting rods are actuated by a cylinder 9 linked to connecting rod 4 and further linked to a support 10 fixed to the drilling machine. The said connecting rods are different in length so as to form a deformable quadrangle to bring dumping guide 1 to an unloading position as cylinder 9 is extended (FIG. 5).

A support 11 is provided on the top of the dumping guide and supports a hydraulic motor 12, the function of which is to actuate in either direction a driving member 13 for bars 14 supporting the drilling tools.

Figure 2:
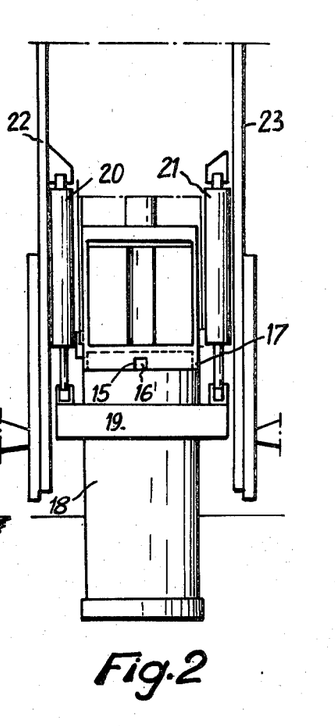
FIGURE 2 is a fragmentary view taken from the side of FIG. 1, with parts omitted for clarity, showing the mechanism for lifting and lowering the cylindrical casing that extends below ground level.
Figure 3:
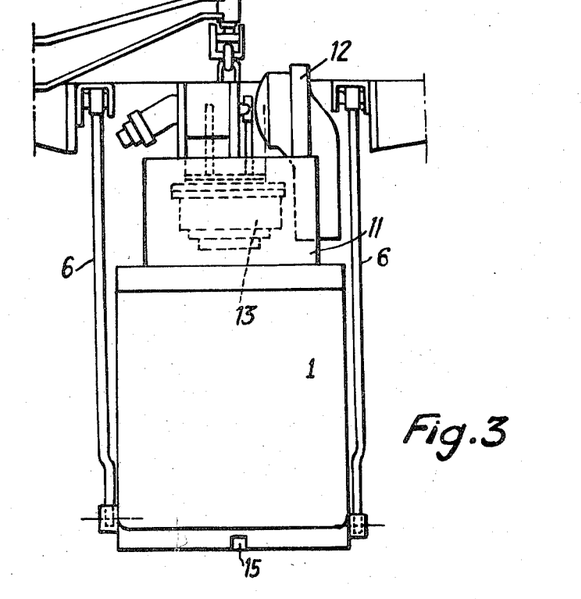
FIGURE 3 is an enlarged fragmentary elevational view of a portion of FIG. 1, taken from the side opposite FIG. 2, with parts omitted for clarity, and showing the structure suspended in a position which is alternative to the position of FIGS. 1 and 2.
Figure 4:
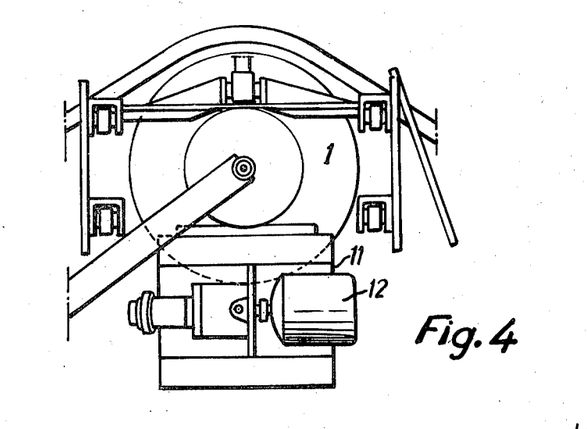
FIGURE 4 is a plan view of the structure of FIG. 3.

An automatic centering member includes elements common to the emptying member. The retraction of cylinder 9 causes dumping guide 1 to return to its position along the drill hole axis. The said guide is provided at its lower end with notches 15 (FIGS. 3, 5) that can be interlocked with lugs 16 machined on flange 17 on a cylindrical casing or drill pipe 18. As shown in FIG. 2, this quick locking pipe is clamped within a collar 19 suspended on cylinders 20 and 21 fixed to uprights 22 and 23 of the drilling machine.

As dumping guide 1 is returned with the help of cylinder 9 to its position approximately along the drilling axis, cylinders 20 and 21 slightly lift drill pipe 18 so that guide 1 rests on flange 17 on drill pipe 18 with lugs 16 engaging notches 15, which renders both the guide and drill pipe integral with one another. In this manner, rotary tool 24 within guide 1 can securely be driven through drill pipe 18 into the drill hole.

Tool-driving bars 14 (usually telescopic type bars) are operated by means of actuating member which is independent of that of the drilling machine. This member is fixed to the upper end of pole 26 of the drilling machine in such a manner that cable 27 supporting bars 14 is as near as possible to the drilling axis. The said actuating member includes a winch 28 actuated by a hydraulic motor 29.

Figure 7:
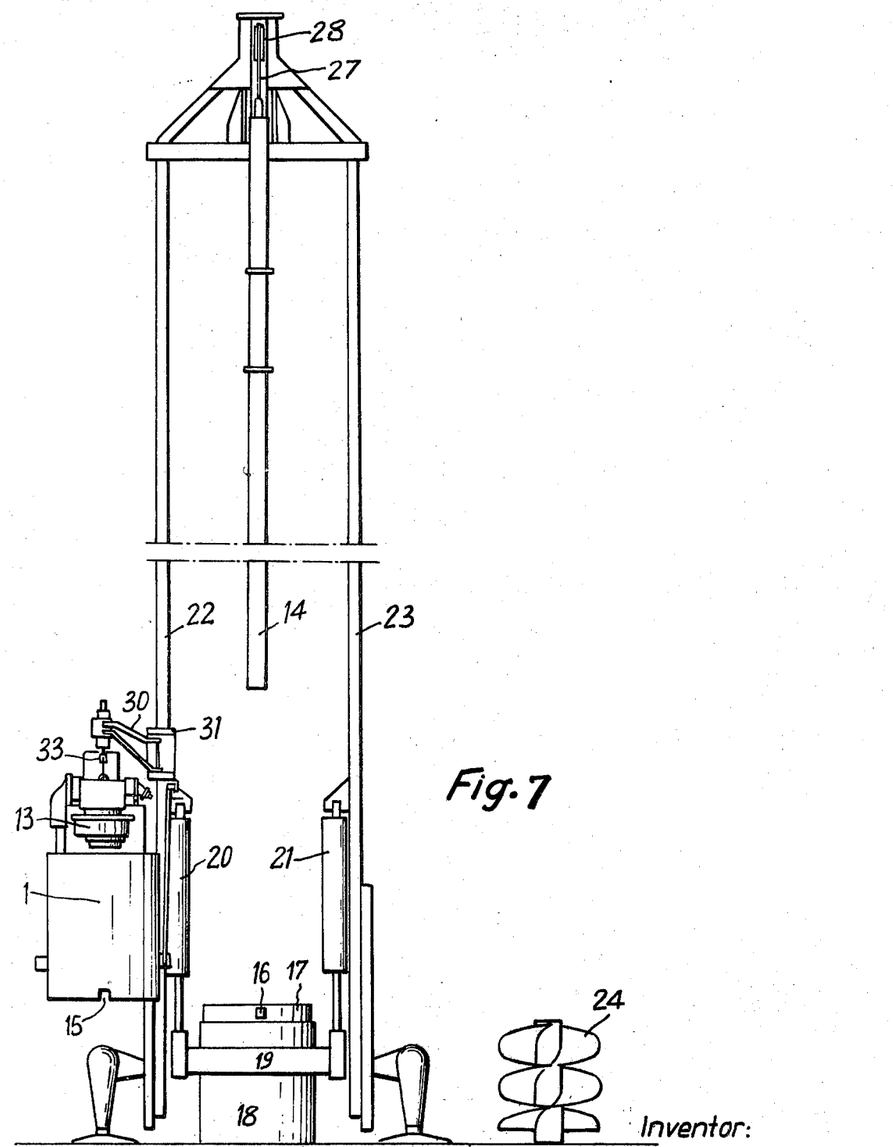
FIGURE 7 is a view similar to FIG. 2, but showing the suspended condition of the equipment of FIG. 3.
Figure 8:
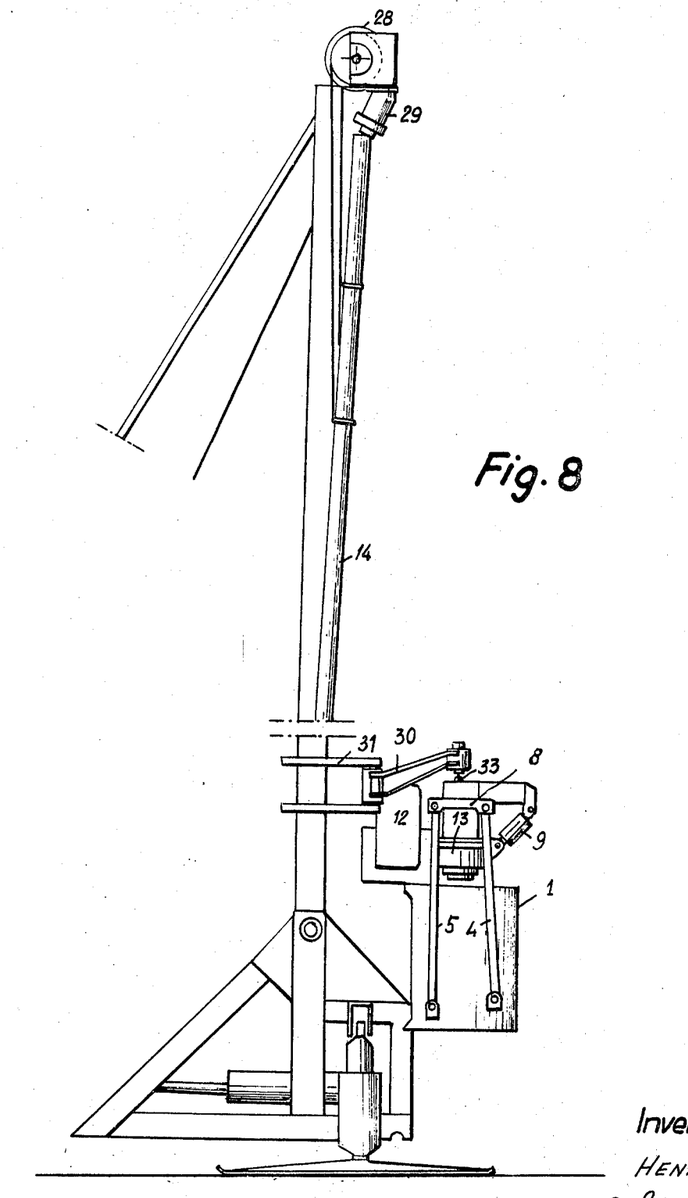
FIGURE 8 is a side view of the parts when in the position of FIG. 7.
Figure 9:
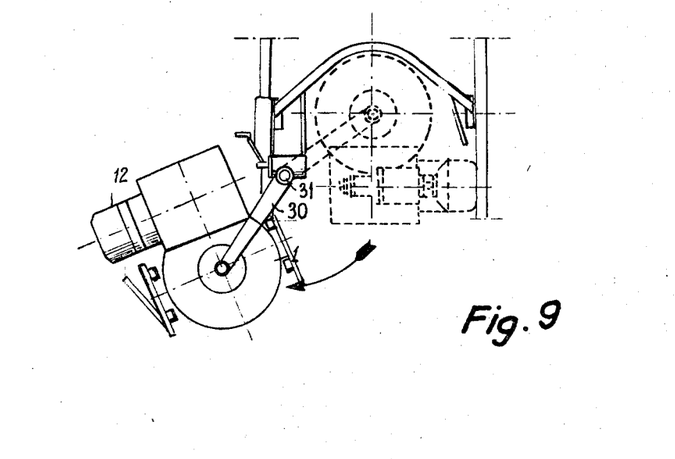
FIGURE 9 is a top plan view of the structure of FIG. 7, with the parts in full line as shown in FIG. 7 and in phantom line in another horizontally swung position.

Referring to FIGS. 7 to 9 further showing this embodiment of the invention, the disengaging member provides a means of removing the various accessories that are necessary to use rotary drilling tools, so as to make it possible for other drilling tools such as special buckets to be used instead, or for the emptying member described above to be suspended on an arm 30 articulated at 31 with the frame of the drilling machine if an additional drill pipe is required in order to ensure a better guiding, or if a different method is to be used (FIG. 7).

The shape of the arm is so designed that the tools needed for the rotation work may be moved aside and clear the drill hole, and that some of these tools may be maintained in a hanging position so that they may be ready to be used again if necessary.

Figure 10:
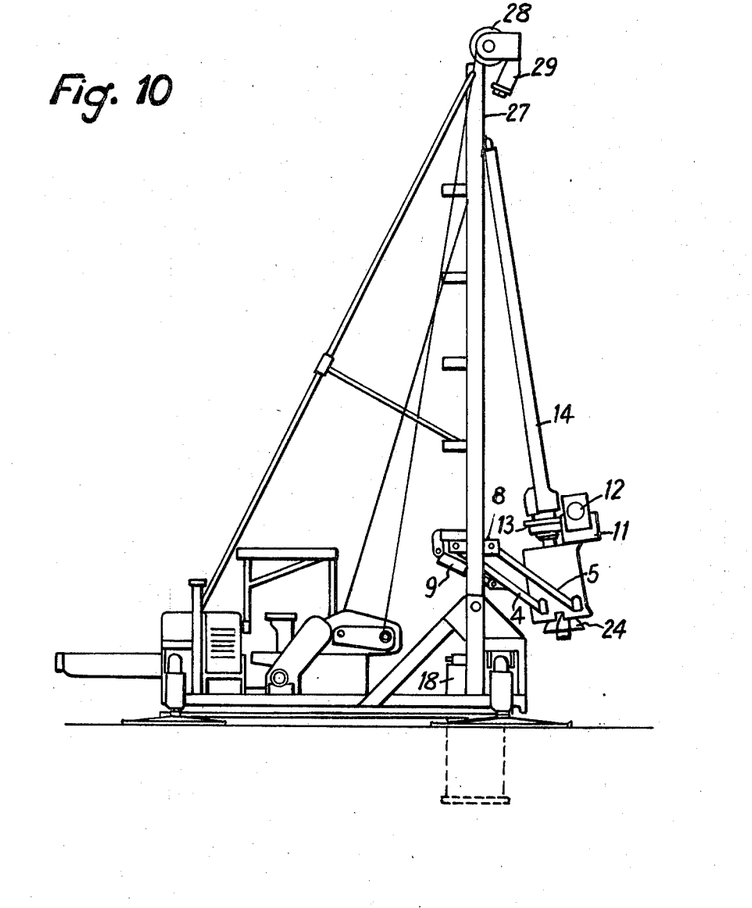
FIGURE 10 is a view similar to FIG. 5, but showing how the apparatus of the present invention may readily be incorporated in known drilling machines of various types.

FIG. 10 shows by way of example an adaptation of the device to a drilling machine.

Figure 1:
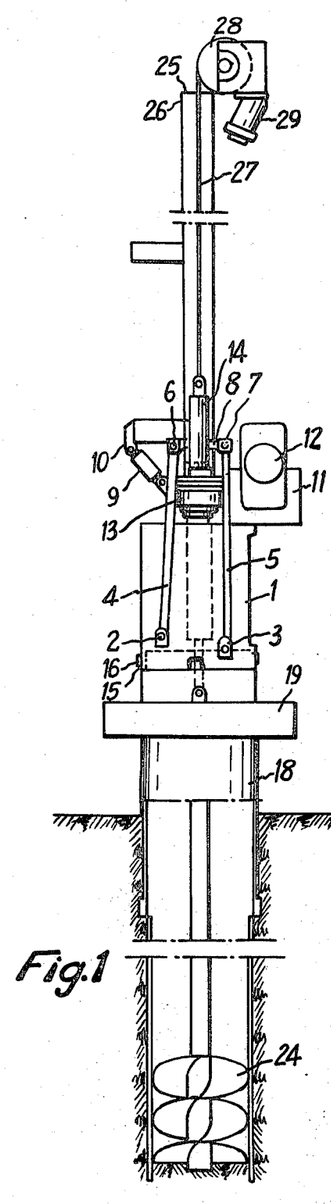
FIGURE 1 is a side elevational view of a first embodiment of a drilling machine according to the present invention, with the parts in position for drilling, and with certain parts omitted for clarity.

The operation of the varied elements described above is as follows:

The machine is assumed to be already equipped for rotary drilling, as shown in FIG. 1. A rotary tool 24 suspended on telescopic driving bars 14 attached to cable 27 is driven through drill pipe 18 to attack the ground at the bottom of the drill hole. When the tool is filled with material, tool 24 together with driving bars 14 are lifted to the position shown in FIG. 5.

When drilling tool 24 is engaged in guide 1, cylinders 20 and 21 are actuated, causing drill pipe 18 to be slightly lowered by collar 19. Lugs 16 disengage notches 15 and simultaneously the operator sets in action cylinder 9 which pushes connecting rod 4, causing guide 1 to be moved together with the parts it supports. In case a screw is used, the drilling tool is rotated at high speed in the reverse direction, and the material trapped between the helices of the screw is driven out in front of guide 1. This material can escape through the front side of the dumping guide since the shape of the rest of the guide is semi-circular. The extracted material is thus thrown out forward in the desired direction either to be piled up in a heap or collected in a receptacle 32.

When the tool is empty, guide 1 is returned together with its accessories to a vertical position by means of cylinder 9.

In order to ensure an accurate centering, cylinders 20 and 21 raise the drill pipe and lugs 16 engage notches 15 provided on guide 1.

The tool is then lowered into the drill hole and drilling is carried further on.

In case the tool must be changed, guide 1 is shifted aside, as shown in FIG. 5, telescopic driving bars 14 are lowered until the tool lies on the ground, and the locking devices on the tool are removed. The tool remains on the ground and the bars can be removed to be equipped with a different tool or in order to permit the use of a different drilling device.

In the latter case, telescopic driving bars 14 are entirely removed from rotary table or driving member 13, as shown in FIG. 8. The removal of the guide and accessories used for the rotary drilling can then be carried out easily, arm 30 being moved to a position plumb with the unit fixed to the frame of the drilling machine and suspended on it with the help of chains and hooks 33. This is done by carrying out all lifting and lowering operations through cylinders 20 and 21.

By actuating cylinders 20 and 21, the quick fixing means such as pins, etc. which connect cross member 8 with the pole of the drilling machine can easily be removed.

Connecting rods 4 and 5 are locked in a practically vertical position on guide 1. Cylinders 20 and 21 are actuated to drive the drill pipe. Guide 1 together with its accessories hangs then on suspending chains 33, and arm 30 can be oriented manually, hydraulically or mechanically so that the whole unit may be withdrawn and occupy the position shown in FIGS. 7, 8 and 9.

Driving bars 14 can then be brought down to the ground to clear the center portion of the machine.

After being unfastened from bars 14, cable 27 is wound up around the drum of winch 28 until it reaches the upper end of the pole. The cable of the drilling machine can then be put back in place to be used to handle the various accessories: buckets, valves, bits, etc.

This cable can also be used to set up an additional drill pipe to be fixed to guiding drill pipe 18 if the drill hole must be tubed at that time.

Now referring to a further embodiment of the invention shown in FIGS. 11 to 19, the emptying member includes a dumping guide 51 movably fixed to a frame 52 supporting the rotary device. Guide 51 is fixed to frame 52 (FIG. 19) by means of a bayonet joint 53 and through one or more locking devices 54 of whatever type holding the guide in position on the plate.

Frame 52 further supports a driving device 12 for the rotary table, allowing the rotation of telescopic driving bars 14 supporting a drilling tool or auger 24.

Figure 18:
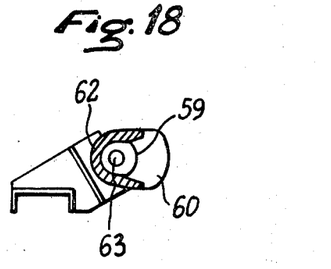
FIGURE 18 is an enlarged fragmentary cross-sectional view in horizontal plan on the line 18—18 of FIG. 16, showing the articulation of the frame whereby it is rendered horizontally swingable.
Figure 19:
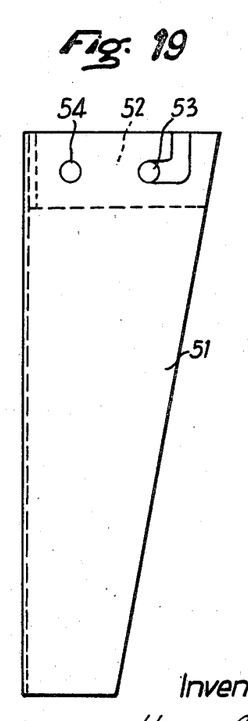
FIGURE 19 is an enlarged side elevational view of the dumping guide of the embodiment of FIG. 11.

Frame 52 is connected through a set of connecting rods 56 and 57 with a rotatable shaft 58 carried by pole 26 of the machine. This shaft 58 permits frame 52 to be shifted through connecting rods 56 and 57 from the drilling to the emptying position and vice versa. Frame 52 is provided with blocks 59 set opposite one another which in drilling position engage supports 60 fixed to pole 26 (FIG. 18). These supports are so designed that when frame 52 is returned to the drilling position, blocks 59 abut centering members 62 on support 60. The shape of these centering members is adapted to accurately position frame 52 as well in the longitudinal plane as in the transverse plane of the machine.

Either one of blocks 59 can be swingably interconnected with support 60 by means of a pin 63 permitting one when it is in place to rotate frame 52 in order to disengage it and to use a different drilling device or set up drill pipes.

Frame 52 is supported by cables 64 attached at one end to the top of the frame of the machine and at the other end to attachments or lugs 65 provided on frame 52. The length of these cables is adjusted by means of tighteners 66.

In order to allow the rotation of frame 52, one of cables 64 and tightener 66 which connect it with frame 52 is shifted so as to be fixed to a lug 67 (FIGS. 15 and 16) provided on the center of the frame. The positioning of this lug is such that the length of the cable, which is adjusted to allow the return of frame 52 to its locking position, does not need to be modified.

The device as described and illustrated according to this further embodiment of the invention is operated as follows:

With the machine in drilling position (FIG. 11), frame 52 supporting the rotary table rests on the bottom of centering blocks 59 and is maintained in this position through connecting rods 56 and 57 and rotatable shaft 58. The action of the rotatable shaft is sufficient to maintain the plate in this position, and the reactive forces caused by starting up the rotary table are absorbed by centering blocks 59.

Drilling tool or auger 24 is lifted as it is filled up with material so as to clear the upper portion of drill pipe 68.

Figure 13:
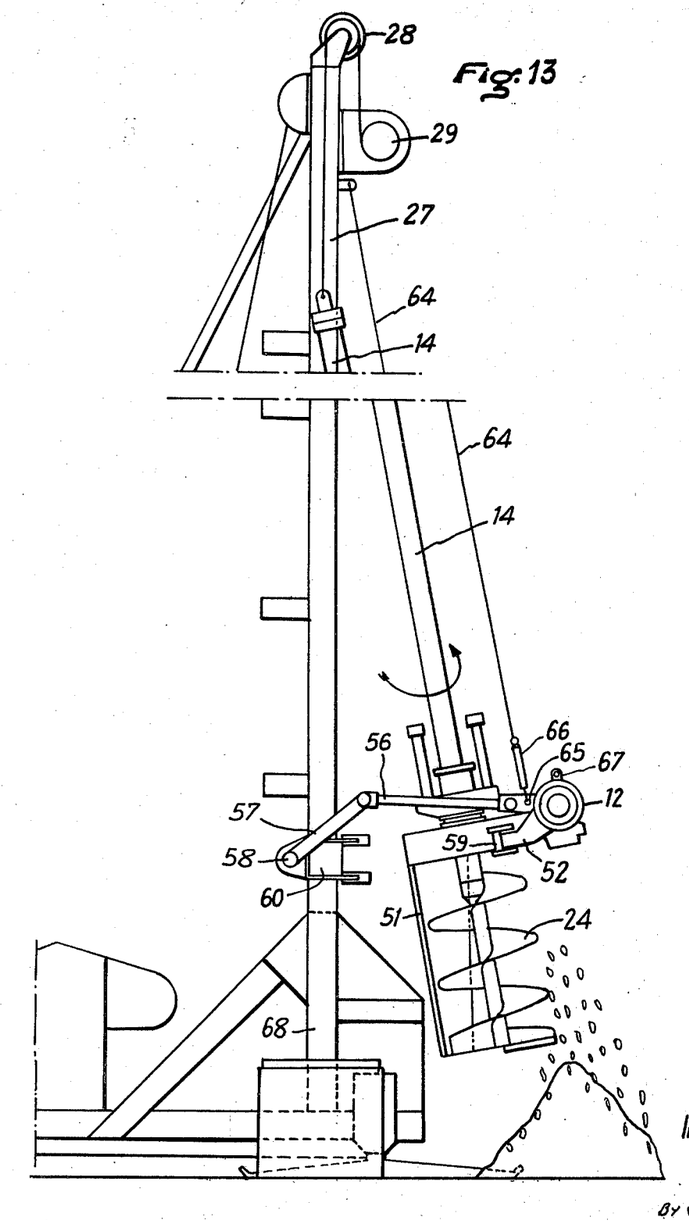
FIGURE 13 is a view similar to FIG. 11, but with the apparatus in an unloading position.

As auger 24 engages guide 51, frame 52 is set in motion through connecting rods 56, 57 and rotatable shaft 58, and the auger is moved to the emptying position shown in FIG. 13. Shaft 58 is rotated in either direction by appropriate power means (not shown).

During its movement, frame 52 is suspended on lift cable 27 which winds up around lift winch 29 after running over pulley 28 on the head of the frame.

Frame 52 is further suspended on cables 64 fixed to lugs 65. In this position, motor 12 for the rotary device is set in motion in the opposite direction to that corresponding to the filling of auger 24, and the material is thrown out in the vicinity of the drill hole.

Figure 11:
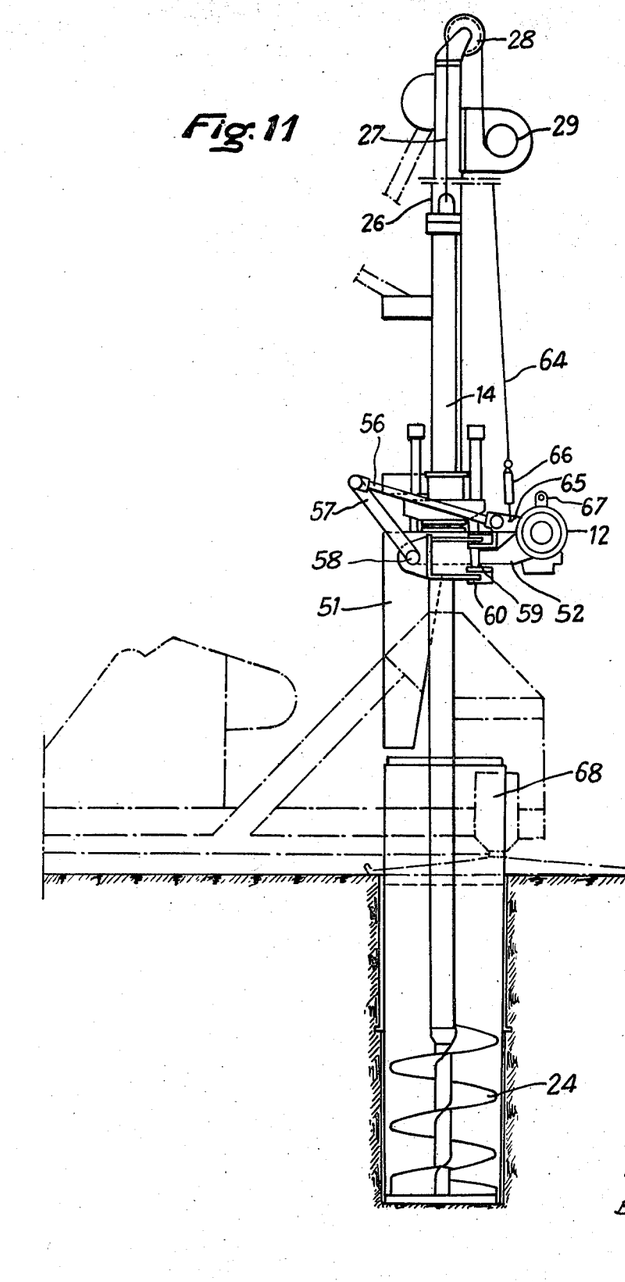
FIGURE 11 is a view similar to FIG. 1, but showing a second embodiment of the invention.
Figure 12:
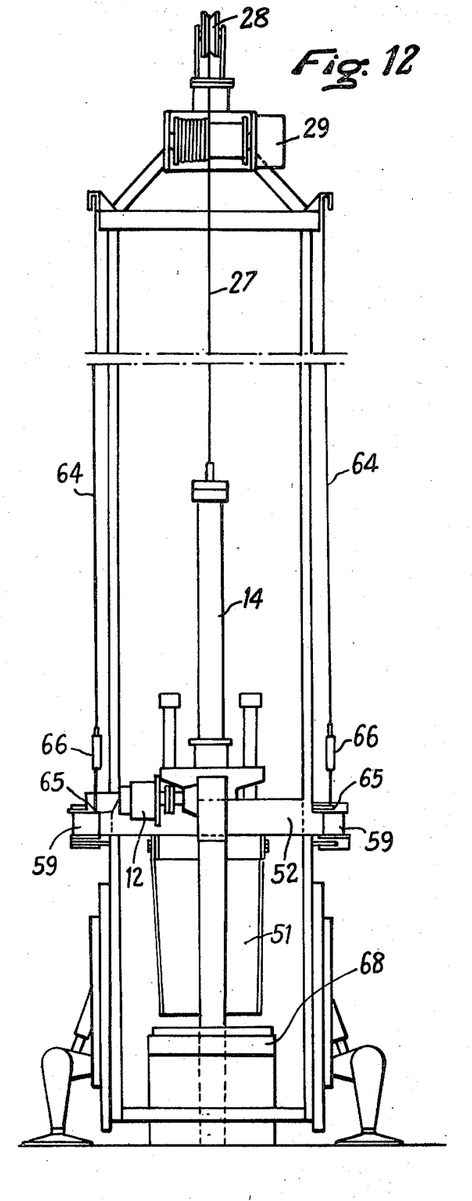
FIGURE 12 is a right side view of the structure of FIG. 11.

When the auger is empty, rotatable shaft 58 is actuated and moves frame 52 back to drilling position through connecting rods 56 and 57 (FIG. 11).

Figure 14:
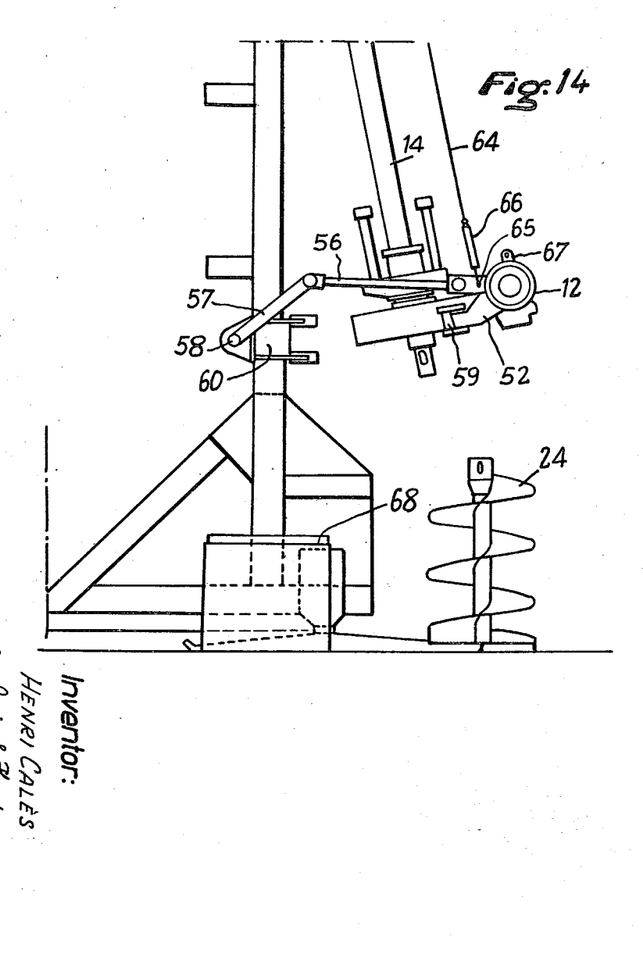
FIGURE 14 shows a fragment of FIG. 13, but with the drilling tool removed.

If a change of drilling method is desired or if additional drill pipes must be set up, the operations are as follows:

Frame 52 and the rotary table it supports are maintained in emptying position by connecting rods 56 and 57 and rotatable shaft 58. Frame 52 is supported by cables 64 and is further maintained or balanced by telescopic driving bars 14 suspended on cable 27 (FIG. 14).

Figure 15:
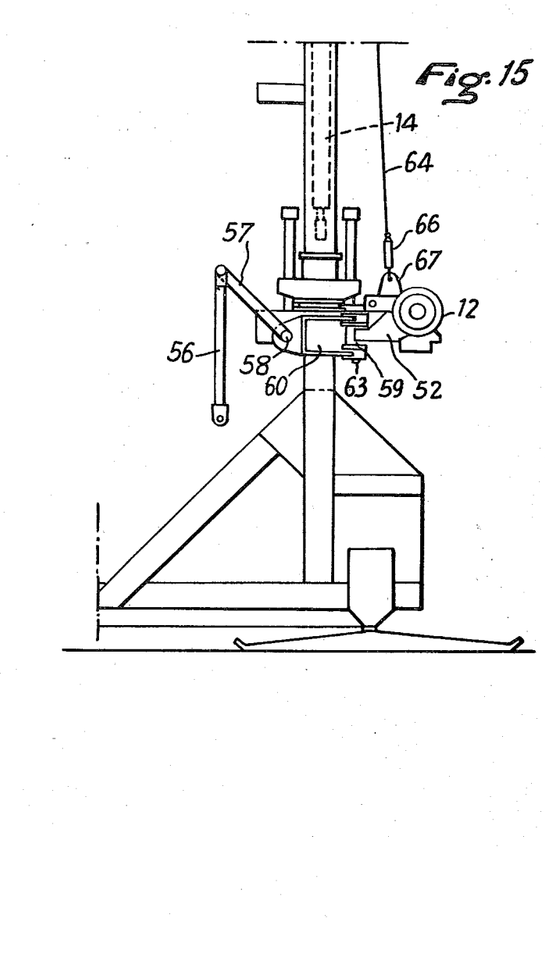
FIGURE 15 is a view similar to FIG. 14, but with the parts rearranged preparatory to withdrawing the rotary table.

The drilling tool proper (auger 24) is unkeyed and removed, and the unit is returned to the blocking position for frame 52 on pole 26, as shown in FIG. 15.

Figures 16, 17:
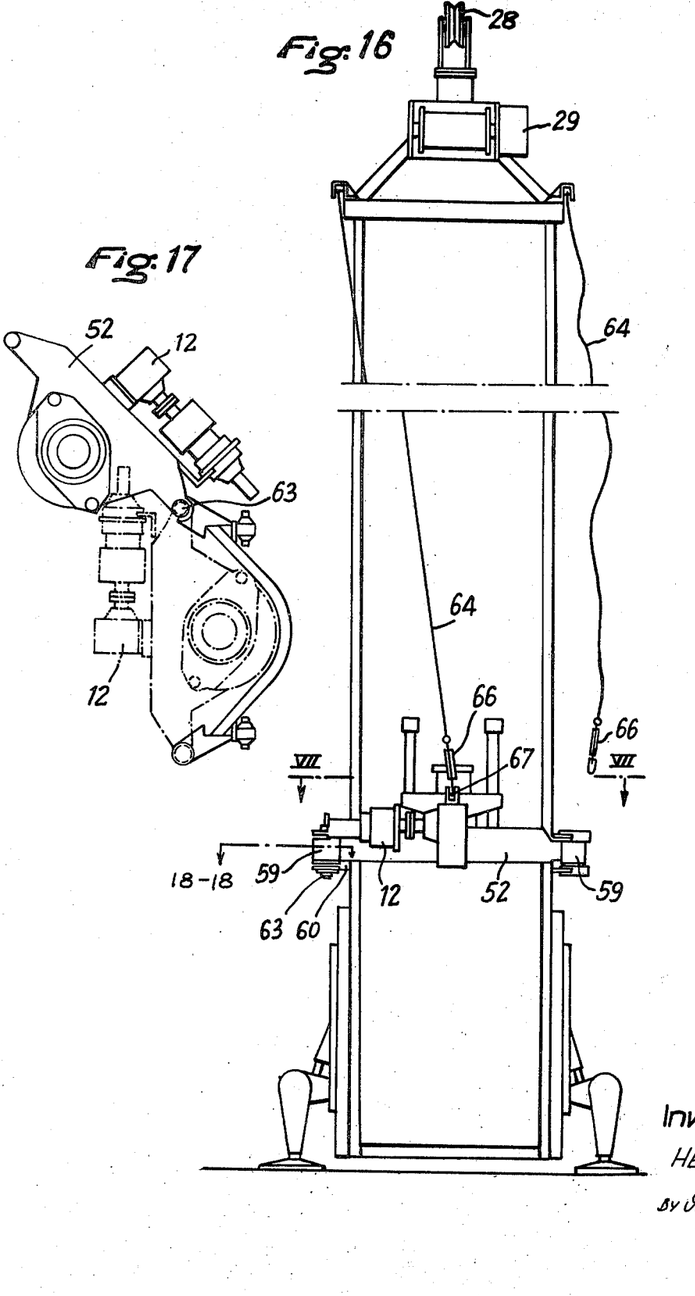
FIGURE 16 is a view similar to FIG. 12, with parts removed for clarity, but showing the same condition of the apparatus as in FIG. 15.
FIGURE 17 is a view similar to FIG. 9, but showing the embodiment of FIG. 11.

Telescopic driving bars 14 are then removed, and connecting rod 56 is disconnected from frame 52 and drawn back, as shown in FIG. 15. Pin 63 being placed in position, cable 64, which was fixed to lug 65, is now shifted and fixed to lug 67, cable 64' hanging loose (FIG. 16). The unit formed by frame 52 and the rotary table can then be oriented as shown in FIG. 17, the machine being free to admit either some tool or other, or drill pipes.

The application of the method derived from this device has been described above. It consists in using any drill pipe provided or not with a cutting templet for the purpose of guiding the drilling tool and avoiding any crumbling of the friable earth encountered at the beginning of drilling operations.

As long as the ground permits the use of rotary tools and provided that no crumbling is to be feared, the tools are used in the usual way with no tubing or addition of special products (sludges, etc.). In case the depth increases or water-bearing strata are encountered, or whenever there is a risk of crumbling, the drill pipe initially used as a guide is then used as a basic element for the drilling column proper.

Owing to the rapidity of the installation or replacement of any tool by another as soon as there is a change in the nature of the ground, or when the efficiency of a certain type of tool appears to be unsatisfactory, this operation can easily be carried out without it being necessary to use a different machine, since only the tools and accessories need to be replaced.

From a consideration of the foregoing disclosure, therefore, it will be evident that all of the initially recited objects of the present invention have been achieved.

Although the present invention has been described and illustrated in connection with preferred embodiments, it is to be understood that the modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A drilling machine comprising a support, means supporting a drilling tool on said support for lateral swinging movement relative to the support in an upright plane, means for raising and lowering the drilling tool relative to the support, a dumping guide open at one side and at least partially encompassing the drilling tool in a raised position of the drilling tool, means mounting the dumping guide on the support for lateral swinging movement with the drilling tool in at least a raised position of the drilling tool, a rotary table carried by said dumping guide for rotating a drilling tool passing through the dumping giude, and motor means carried by the dumping guide for rotating said table.

2. A drilling machine comprising a support, means supporting a drilling tool on said support for lateral swinging movement relative to the support in an upright plane, means for raising and lowering the drilling tool relative to the support, a dumping guide open at one side and at least partially encompassing the drilling tool in a raised position of the drilling tool, and means mounting the dumping guide on the support for lateral swinging movement with the drilling tool in at least a raised position of the drilling tool, the last-named means comprising link means pivotally interconnected between said support and said dumping guide and swingable in an upright plane about parallel horizontal axes, said link means comprising quadrilateral linkage including a pair of links each of which is pivotally connected at opposite ends to said support and to said dumping guide.

3. A drilling machine comprising a support, means supporting a drilling tool on said support for lateral swinging movement relative to the support in an upright plane, means for raising and lowering the drilling tool relative to the support a dumping guide open at one side and at least partially encompassing the drilling tool in a raised position of the drilling tool, means mounting the dumping guide on the support for lateral swinging movement with the drilling tool in at least a raised position of the drilling tool, the last-named means comprising link means pivotally interconnected between said support and said dumping guide and swingable in an upright plane about parallel horizontal axes, said link means comprising a pair of links pivotally interconnected in end-to-end relation, the free end of one link being pivotally interconnected to the dumping guide and the free end of the other link being pivotally interconnected to said support, and means acting on one of said links to swing the links and dumping guide.

4. A drilling machine comprising a support, means supporting a drilling tool on said support for lateral swinging movement relative to the support in an upright plane, means for raising and lowering the drilling tool relative to the support, a dumping guide open at one side and at least partially encompassing the drilling tool in a raised position of the drilling tool, means mounting the dumping guide on the support for lateral swinging movement with the drilling tool in at least a raised position of the drilling tool, an upright cylindrical casing through which the drilling tool extends below the surface of the ground, means on the support for raising the casing into contact with the lower end of the dumping guide, and means engaging between the dumping guide and the casing in the raised position of the casing to prevent rotation of the dumping guide and casing relative to each other.

References Cited

UNITED STATES PATENTS 2,822,147   2/1958   Allard _____________ 175—161
3,026,950   3/1962   Johnson ____________ 175—161

FOREIGN PATENTS 815,251   6/1959   Great Britain.

JAMES A. LEPPINK, Primary Examiner
R. E. FAVREAU, Assistant Examiner

U.S. Cl. X.R.
175—84, 85